(No Model.)

A. F. VETTER.
STORAGE BATTERY.

No. 557,920. Patented Apr. 7, 1896.

WITNESSES:
William P. Goebel
G. M. Hopkins,

INVENTOR
A. F. Vetter
BY
Munn & Co
ATTORNEYS.

UNITED STATES PATENT OFFICE.

ALEXANDER F. VETTER, OF NEW YORK, N. Y.

STORAGE BATTERY.

SPECIFICATION forming part of Letters Patent No. 557,920, dated April 7, 1896.

Application filed August 30, 1895. Serial No. 560,977. (No model.)

*To all whom it may concern:*

Be it known that I, ALEXANDER F. VETTER, of New York city, in the county and State of New York, have invented a new and Improved Storage Battery, of which the following is a full, clear, and exact description.

The object of my invention is to provide a storage battery of simple and inexpensive construction in which the active material will be positively held in the plates, and in which positive connections with the plates will be effected by arms connected integrally with the metal of the plates.

My invention consists in a storage battery formed of plates inclosing the active material and provided with downwardly-inclined openings for the circulation of the electrolyte, all as will be hereinafter more fully described.

Reference is to be had to the accompanying drawings, forming a part of this specification, in which similar characters of reference indicate corresponding parts in all the views.

Figure 1:
Figure 2:
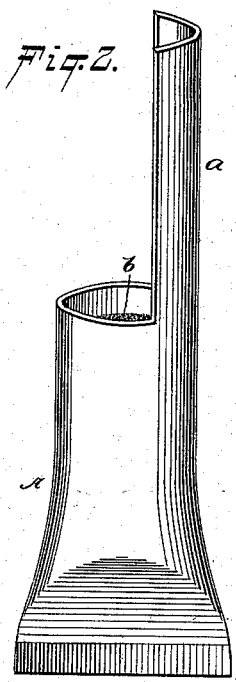
Figure 3:
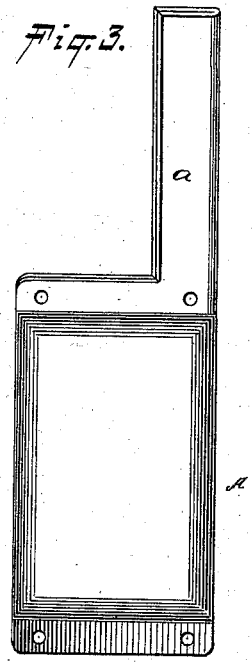
Figure 4:
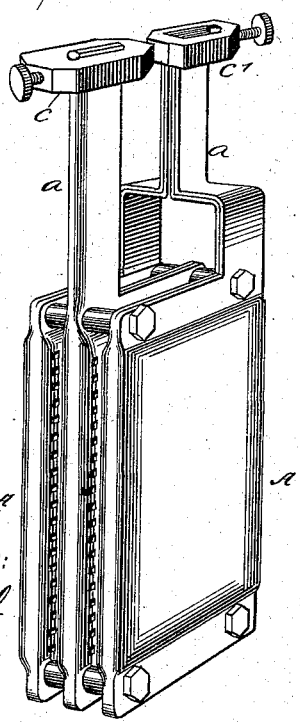

Figure 1 is a perspective view of a section of lead pipe of which the plate is formed. Fig. 2 is a perspective view of an incomplete plate. Fig. 3 is a side elevation of a complete plate. Fig. 4 is a perspective view of the battery formed of a positive and two negative plates, and Fig. 5 is a longitudinal section of the same.

In carrying out my invention I take a piece of ordinary lead pipe A and press the sides together at the lower end, closing the tube, as shown in Fig. 2, and cut away the upper end of the tube, leaving the half-tube extension $a$. In the tube-section thus closed at the bottom I place a quantity of active material $b$ and then I close the top of the pipe-section and afterward apply pressure to the sides thereof, reducing it to a flat plate, as shown in Fig. 3, with the half-tube extension $a$ flattened, forming a conductor.

Figure 5:
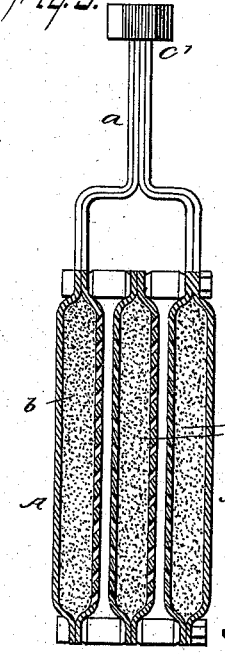

The outside or end plates, which constitute the negative elements of the battery, are perforated on their inner faces with holes inclined downwardly toward the center of the plate, as shown in the sectional view, Fig. 5, while the outer surface of the plate is left intact. The positive plate is perforated in this manner in both sides with inclined holes, as shown. This method of perforating the plates insures the retention of the active material in the plate.

The upward extension of the positive plate is provided with a clamp $c$ for receiving the conductor which conveys away the current, and the upward extensions of the negative plates are bent so as to bring them together, as shown in Figs. 4 and 5, and are provided with a clamp $c'$, which is common to both extensions.

The plates thus constructed are connected together by bolts and distance-pieces of insulating material, as shown in Figs. 4 and 5, and the battery is formed by subjecting the plates to the action of the current in the usual way.

Having thus described my invention, I claim as new and desire to secure by Letters Patent—

1. A battery-plate formed of a section of lead pipe or tube closed at one end, and cut away at the other end to form a conductor provided with a filling of active material closed together at the top and flattened, and furnished with perforations, substantially as specified.

2. A battery formed of a hollow positive plate filled with active material and furnished with inclined perforations on opposite sides, and hollow negative plates filled with active material and furnished with inclined perforations in their inner sides, the positive and negative plates being furnished with extensions formed integrally with the plate, as specified.

ALEXANDER F. VETTER.

Witnesses:
  C. SEDGWICK,
  F. W. HANAFORD.